Jan. 19, 1965 YVES-JEAN F. BRETTE 3,166,740

MULTIPLE MAGNETIC HEADS

Filed Dec. 30, 1959 3 Sheets-Sheet 1

Jan. 19, 1965 | YVES-JEAN F. BRETTE | 3,166,740

MULTIPLE MAGNETIC HEADS

Filed Dec. 30, 1959 | 3 Sheets-Sheet 3

United States Patent Office 3,166,740
Patented Jan. 19, 1965

3,166,740

MULTIPLE MAGNETIC HEADS

Yves-Jean Francois Brette, Sevres, France, assignor to Compagnie des Machines Bull (Société Anonyme), Paris, France Filed Dec. 30, 1959, Ser. No. 862,852
Claims priority, application France, Jan. 6, 1959, 783,351, Patent 1,213,217
3 Claims. (Cl. 340—174.1)

This invention relates to multiple magnetic heads comprising transducer elements juxtaposed in such manner that their air gaps are situated in proximity to one another along a line.

Known magnetic heads of this type are used for the simultaneous recording of signals at closely spaced points on a magnetic recording medium and for the simultaneous restoration of signals thus recorded. In order to reduce the crosstalk which then occurs between the transducer elements, the shielding means having various compositions and various forms have been used in the construction of such heads. Screens consisting of magnetic substance which are disposed between adjacent transducer elements to avoid crosstalk, however, constitute considerable leakage permeances, and this is generally accompanied by a reduction in the useful flux at recording or at reading. A gap is then provided between these screens and the adjacent transducers. This gap nevertheless remains smaller than one half of the already reduced gap separating two adjacent transducers. In addition, such screens, as also the other shielding elements, become ineffective when their thickness is reduced in order to reduce the gaps between the transducers, and they are the more difficult to prepare and to position as their dimensions are smaller.

One object of the invention is to obviate the aforesaid disadvantages.

Accordingly, the invention provides a multiple magnetic head comprising a plurality of flat electromagnetic transducers, each including a magnetic core with pole ends which are spaced from each other to provide an air gap, a first leg carrying a coil and terminating in one of said pole ends, and a second leg terminating in the other of said pole ends, said transducers being assembled side by side with their air gaps in alignment within a common plane and with coils of adjacent transducers on opposite sides of said common plane, the second leg of the core of each transducer lying along the second leg of the adjacent cores and being so formed that large portions of the second leg of adjacent cores are overlapping each other.

By virtue of the invention it is possible to construct multiple magnetic heads which are substantially smaller than those heretofore provided. This may be effected by a form and an arrangement of the magnetic circuits such that some parts of the magnetic circuits of each transducer perform a magnetic shielding function with respect to the adjacent transducers, so that the insertion of additional shielding members between transducers can be completely avoided.

The invention is particularly applicable to a multiple magnetic head intended for the direct reading of characters formed by means of a magnetic substance on a non-magnetic support.

Figure 1:
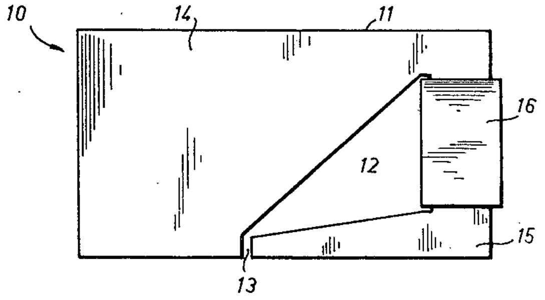
Figure 2:
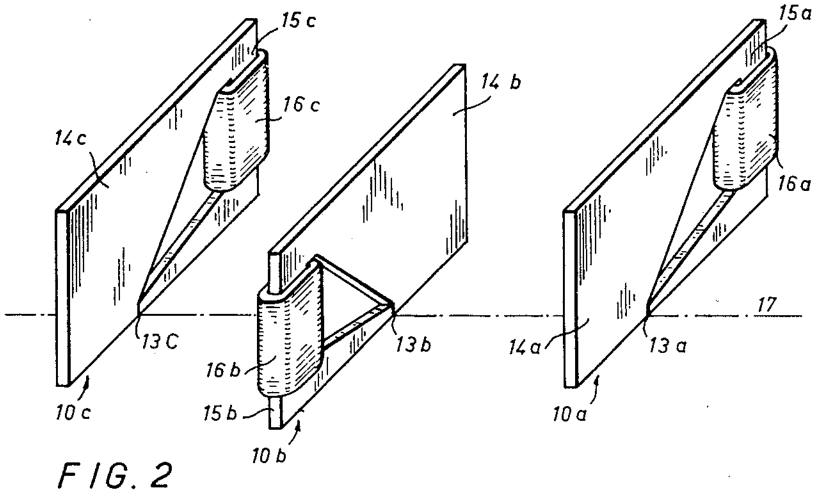
Figure 3:
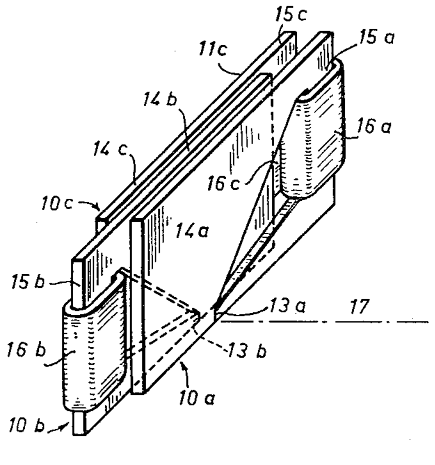
Figure 4:
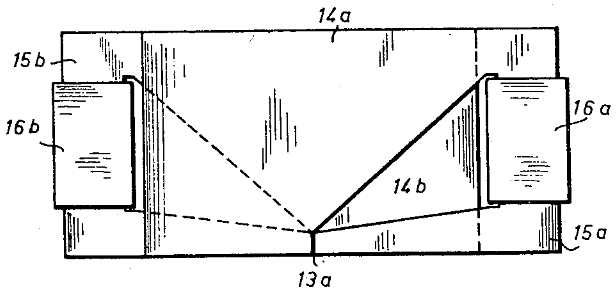
Figure 5:
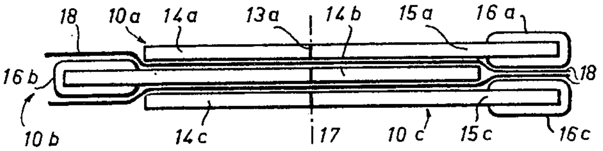
Figure 6:
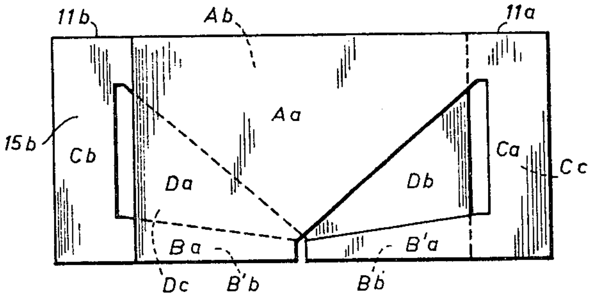
Figure 9:
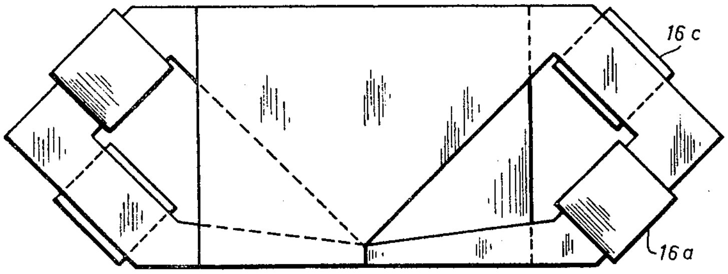
Figure 10:
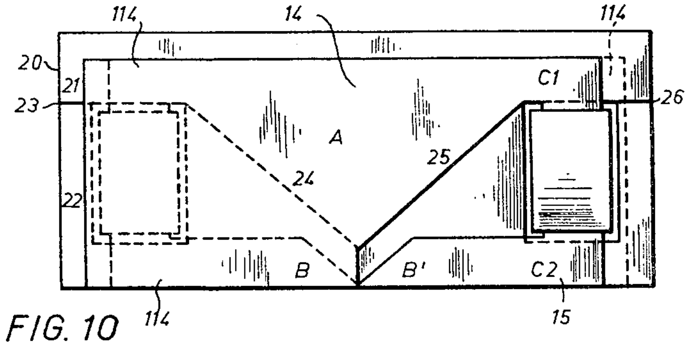
Figure 11:
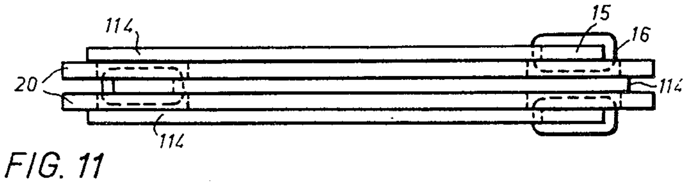

For a better understanding of the invention and to show how it may be carried into effect, the same will now be described, by way of example, with reference to the accompanying drawings, in which:

FIGURE 1 is an elevational view of a transducer element for a multiple magnetic head according to the invention, FIGURE 2 is an exploded perspective view of a multiple magnetic head according to an embodiment of the invention, comprising three transducer elements, FIGURE 3 is a perspective view of the multiple head showing the transducer elements assembled together, FIGURE 4 is an elevational view of the multiple head illustrated in FIGURES 2 and 3, FIGURE 5 is an underneath plan view of said head, FIGURE 6 is a view similar to that of FIGURE 4, showing elements which are employed in the operation of multiple heads according to the invention, FIGURES 7, 8, 9 and 10 are views similar to FIGURE 4, showing further embodiments of the invention, and FIGURE 11 is an underneath plan view showing a modified constructional form of the multiple head.

FIGURE 1 illustrates a transducer element 10, such as is employed with other similar transducer elements in the formation of a multiple head according to a first embodiment of the invention.

The transducer element 10 comprises essentially a magnetic circuit having an air gap and an electric winding.

The magnetic circuit consists of a rectangular plate 11 of magnetic material formed with a triangular recess 12 extended by a slot 13, which forms the air gap of the magnetic circuit. The magnetic circuit comprises on either side of the air gap a wide portion 14 and a narrow portion 15 respectively. A flat winding 16 is disposed around the narrow portion.

As is shown in FIGURE 2, the transducer elements 10a, 10b and 10c forming a multiple head are of like dimensions. They are arranged in the order 10a, 10b, 10c and in such manner that the limbs 15a, 15b, 15c on which the windings are mounted are situated alternately to the right and to the left of the uprights 14a, 14b, 14c. The said transducer elements form, when assembled, a single sandwich (FIGURE 3). The air gaps are then aligned along the axis 17, the uprights 14a, 14b, 14c overlap over a portion of their surface, and the windings 16a, 16b, 16c are situated outside the said sandwich as clearly shown in FIGURE 5, the windings of the even transducers being aligned on one side, and those of the odd transducers on the other side of the uprights 14a, 14b, 14c.

It will be seen from FIGURE 5 that, by reason of this arrangement, a gap equal to the thickness of one transducer is available between the limbs (15a, 15c) of the transducer elements of like parity to receive the windings (16a, 16c).

The multiple head according to the invention may comprise in addition members such as 18 (FIGURE 5) separating the various magnetic circuits. These members, which are endowed with appropriate properties, can perform a complementary function in the operation of the multiple head. They may serve also to reduce the wear on the magnetic circuits at the level of the air gap and to support the output terminals of the windings.

For the sake of clarity, such members have not been illustrated in FIGURES 2, 3 and 4 of the drawings.

FIGURE 6 is similar to FIGURE 4, but the magnetic circuits therein are shown without their windings.

In the magnetic circuit 11_a_, the various parts which will hereinafter be defined are denoted by B_a_, D_a_, A_a_, C_a_ and B'_a_. Homologous parts of the circuits 11_b_ and 11_c_ will be denoted by the same capital letters B, D, A, C, B' together with the indices _b_ and _c_ respectively.

The parts A_a_, B_a_, B'_a_ of the circuit 11_a_ are those which overlap some parts of the adjacent circuit 11_b_ and are consequently separated by the latter from the following circuit of like parity (11_c_ of FIGURE 3).

The parts C_a_ and D_a_ are those which are not separated from the circuit of like parity (11_c_, FIGURE 3) by the adjacent circuit 11_b_.

The opposing parts A_a_ and A_b_, B_a_ and B'_b_, and B'_a_ and B_b_ of the adjacent circuits determine leakage permeances $P_A$, $P_B$ and $P'_B$ between these circuits ($P'_B$ being identical to $P_B$) and the opposing parts C_a_ and C_c_, and D_a_ and D_c_ of the successive circuits of like parity determine leakage permeances $P_C$ and $P_D$ between circuits of like parity.

In the following, no account will be taken of the permeances $P_D$.

When a magnetomotive force is applied to the air gap in the magnetic circuit 11_a_, it may be considered in the first place that there is a main leakage flux in the circuit consisting of: the part B'_a_ of the circuit 11_a_, the permeance $P_B$ (identical to $P'_B$) between the adjacent parts B'_a_, and B_b_, the parts B_b_, D_b_ and A_b_ of the adjacent circuit 11_b_, the permeance $P_A$ between the adjacent parts A_b_ and A_a_ and the parts A_a_, D_a_, B_a_ of the circuit 11_a_. It will therefore be seen that the circuit of the stray flux considered is closed by the parts B_b_, D_b_, A_b_ of the adjacent circuit 11_b_, but not by the limb 15_b_ of the circuit supporting the winding. Owing to this arrangement of the invention, crosstalk between adjacent transducers is substantially reduced. A closer study of the various stray fluxes indicates that the crosstalk between adjacent transducers varies in the same sense as the permeance $P_B$ and inversely to the permeance $P_A$, and that the crosstalk between transducers of like parity varies in the same sense as the permeances $P_A$, $P_B$ and $P_C$. These results have been experimentally confirmed.

Therefore, the crosstalk between adjacent transducers is reduced by increasing the permeance $P_A$, but the crosstalk between transducers of like parity is then increased. This crosstalk, however, remains low if the permeances $P_B$ and $P_C$ are themselves low, and it is lower than the crosstalk between adjacent heads.

In practice, in order to reduce crosstalk both between adjacent transducers and between transducers of like parity of a multiple head according to the invention, it will be advantageous to increase the permeance $P_A$ and to reduce the permeances $P_B$ and $P_C$. For this reason, the contour of the magnetic circuits may be so chosen that the ratio of the areas A to the areas B and to the areas C is as large as possible.

Figure 7:
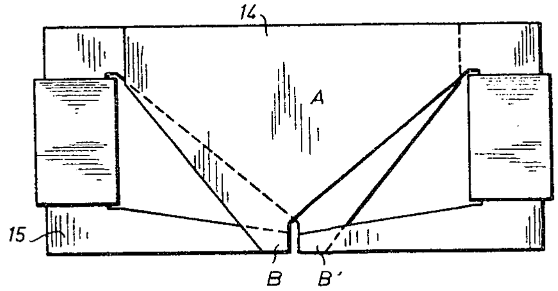

In the embodiment of the invention as illustrated in FIGURE 7, the part 14 of the magnetic circuit has been so modified as to overlap the limb 15 of the adjacent transducers only in the immediate neighbourhood of the air gap, so that the overlap areas B (and B') and consequently the permeances $P_B$ are extremely small.

In order to increase the permeances $P_A$, the space situated between the parts A of the adjacent circuits will advantageously be filled with magnetic material. For example, this effect may be produced by increasing the thickness of the parts A themselves.

The invention is not limited to a multiple magnetic head consisting of like transducers or of transducers comprising windings arranged in like manner.

Figure 8:
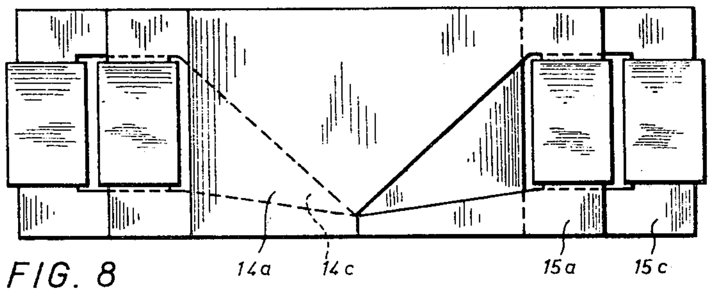

For example, it will be seen in FIGURE 8 that the limbs 15_a_ and 15_c_ of the successive transducers of like parity may be disposed at different distances from the uprights 14_a_ and 14_c_, and from FIGURE 9 that the windings 16_a_ and 16_c_ of two successive transducers of like parity may be differently positioned on the transducers.

This makes it possible to leave more space for the windings and to modify the permeances $P_C$.

An importance application of the inventive idea consists in providing a lateral extension 114 (FIGURES 10 and 11) on the uprights 14 of the magnetic circuits, so that the portions C of the limbs 15 are separated from the transducers of like parity by this extension. If then the regions C1 and C2 respectively above and below the windings 16 in the parts C in FIGURE 10 are considered, it will be seen that the leakage permeances P1 and P2 existing between these regions C1 and C2 and the extensions 114 of an adjacent circuit are in parallel with the previously defined permeances $P_A$ and $P_B$ respectively. All the stray fluxes of any appreciable value in each transducer are therefore closed through the uprights 14 and the extensions 114 of the adjacent transducers without passing through the succeeding transducers, so that the crosstalk between transducers of like parity is substantially eliminated.

The screens illustrated at 20 in FIGURES 10 and 11 may be formed in two parts 21 and 22 situated in a common plane and separated by the lines 23, 24, 25, 26. These parts may consist of different materials.

Other arrangements and other forms of the elements of a multiple head may be envisaged within the scope of the invention.

Laminated or compressed powder materials may naturally be employed to form the magnetic members.

The uprights 14 of the transducers may consist, at least partially, of members of magnetic material common to the various transducers.

All the magnetic circuits may be integrally formed, their uprights 14 then forming a single block.

Multiple magnetic heads according to the invention are particularly applicable to the direct reading of characters printed in magnetic ink on cheques. The invention makes it possible to provide multiple heads comprising 10 juxtaposed transducers over a width of 3 millimetres, which corresponds to the height of the numerals thus printed. The windings of the various transducers are then individually connected to amplifiers, the outputs of which supply signals to a decoding device.

I claim:

1. A multiple magnetic head comprising a plurality of identical flat electromagnetic transducers each including a magnetic core having the general shape of a rectangular plate provided with a substantial triangular inner aperture, one side of said aperture being parallel to and near one of the short sides of the rectangular plate, a first leg of said core being defined between these parallel sides, and the apex of said triangular aperture opposite said one side thereof being close to the middle of one of the long sides of said rectangular plate, a second leg of said core being defined between a second side of said aperture and the second one of the short sides of the rectangular plate, said plate being further provided with a slit perpendicular to said long side joining said side to said apex and forming a working air gap in said core, each of said transducers further including a coil carried by said first leg of the core, and said transducers being assembled side by side with their air gaps in alignment within a common plane and with coils of adjacent transducers on opposite sides of said common plane, the second leg of the core of each transducer overlapping large portions of the second leg of adjacent cores.

2. A multiple magnetic head as claimed in claim 1, wherein the portions of said second leg of each core which overlap the second leg of adjacent cores are given an additional thickness.

3. A multiple magnetic head comprising a plurality of flat electromagnetic transducers each including a coil and a flat magnetic core with two pole ends which are facing each other on opposite sides of a plane to provide a working air gap, such core having the general shape of a plate the periphery of which is approximately symmetrical with respect to said plane, said plate being provided with a triangular inner aperture located on one side of said plane, an apex of said aperture lying in said plane close to the periphery of said plate, said plate being further provided with a slit joining said apex to the periphery of the plate along said plane and forming said working air gap in the core, the part of the core located along this side of the aperture which is opposite said apex, forming a leg of the core which carries the coil of the transducer, the cores of the several transducers being of the same size and said transducers being assembled side by side with their air gaps in alignment within a common plane and with coils of adjacent transducers on opposite sides of said common plane.

References Cited by the Examiner

UNITED STATES PATENTS

| | | | |
|---|---|---|---|
| 2,732,275 | 1/56 | MacNeill | 179—100.2 |
| 2,784,259 | 3/57 | Camras | 179—100.2 |
| 2,807,676 | 9/57 | Lynn | 179—100.2 |
| 2,840,643 | 6/58 | Brower | 179—100.2 |
| 2,872,530 | 2/59 | Jolly | 179—100.2 |

IRVING L. SRAGOW, *Primary Examiner.*

ROBERT H. ROSE, DAVID G. REDINBAUGH, *Examiners.*